United States Patent [19]

Timm

[11] 4,231,103
[45] Oct. 28, 1980

[54] FAST FOURIER TRANSFORM SPECTRAL ANALYSIS SYSTEM EMPLOYING ADAPTIVE WINDOW

[75] Inventor: John E. Timm, La Jolla, Calif.

[73] Assignee: The United States of America as represented by the Secretary of the Navy, Washington, D.C.

[21] Appl. No.: 11,339

[22] Filed: Feb. 12, 1979

[51] Int. Cl.³ .................................................. G06F 15/332
[52] U.S. Cl. .................................................... 364/726
[58] Field of Search ............. 364/726, 724; 324/77 E, 324/77 F

[56] References Cited

U.S. PATENT DOCUMENTS

| | | | |
|---|---|---|---|
| 3,611,411 | 10/1971 | Moshier | 324/77 E X |
| 3,714,566 | 1/1973 | Kang | 324/77 E |
| 3,721,812 | 3/1973 | Schmidt | 364/726 |
| 3,731,188 | 5/1973 | Smith | 324/77 E |
| 3,808,412 | 4/1974 | Smith | 364/724 |
| 4,054,785 | 10/1977 | Lehmann | 364/726 |

OTHER PUBLICATIONS

Harris, "On the Use of Windows for Harmonic Analysis With the Discret Fourier Transform", *Proceedings of the IEEE*, vol. 66, No. 1, Jan. 1978, pp. 51–83.
Babic et al., "Optimum Low-Order Windows for Discrete Fourier Transform Systems", *IEEE Trans. on Acoustics, Speech, and Signal Processing*, vol. ASSP-24, No. 6, Dec. 1976, pp. 512–517.

*Primary Examiner*—David H. Malzahn
*Attorney, Agent, or Firm*—Richard S. Sciascia; Ervin F. Johnston; James O. Skarsten

[57] ABSTRACT

A spectral analysis system includes a Fast Fourier Transform (FFT) processor which receives a time domain signal and provides a specified number of initial signal strength estimates, each of the initial estimates being equal to one of the frequency domain coefficients of the Fast Fourier Transform of the time domain signal which is generated when the time domain signal is sampled at a number of intervals equal to the number of initial estimates, over a time period of specified duration. The system further includes an adjustable window element receiving a selected number of the initial estimates for sensing or detecting the presence of a leakage component in a given one of the initial estimates, and for providing an adjusted signal strength estime, the adjusted signal strength estimate comprising the difference between the given initial estimate and the leakage component. A spectral recorder receiving a number of adjusted estimates is provided to record the spectral lines, or frequency components, of the time domain signal, and the relative strengths thereof.

16 Claims, 5 Drawing Figures

FAST FOURIER TRANSFORM SPECTRAL ANALYSIS SYSTEM EMPLOYING ADAPTIVE WINDOW

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to the field of spectral analysis, that is, to the field of determining or estimating the constituent frequency components of a signal occurring over time, and the relative strengths of such frequency components. More particularly, the invention pertains to systems for spectral analysis which employ methods or apparatus structured according to the Fast Fourier Transform technique (FFT). Even more particularly, the invention pertains to such systems wherein the window employed in the Fast Fourier Transformation is iteratively adjusted or adapted in response to the amount of leakage which is present in the frequency domain representations of the signal which are generated by the transformation process.

The Fast Fourier Transform technique has become established as a very useful tool in spectral analysis. By making use of the FFT technique, digital processing technology may be employed to rapidly represent a time domain signal $x(t)$, over a finite time period, by a series of discrete frequencies $f_m$, each having a frequency domain coefficient $X(f_m)$.

The relationships between time domain signal $x(t)$ and frequency domain coefficients $X(f_m)$ are shown by the following equations, the Discrete Fourier Transform (DFT) pair:

$$X(f_m) = \frac{1}{N} \sum_{n=0}^{N-1} x(n\Delta T) e^{j2\pi mn/N} \quad \text{Eqn. 1}$$

$$x(n\Delta T) = \sum_{m=0}^{N-1} X(f_m) e^{j2\pi mn/N} \quad \text{Eqn. 2}$$

where m and n are both integers, m, n = 0, 1, ... N−1.

To implement the above DFT relationships, $x(t)$ is sampled a total of N times over a time period of time duration T, at sampling intervals of $\Delta T$. Successive samples of $x(t)$ are coupled through an array of N digital filters, each filter corresponding to a frequency $f_m$ and providing one of the frequency domain coefficients $X(f_m)$. Each frequency component is given by the relation $f_m = m/T$, and each coefficient $X(f_m)$ represents the relative strength of time domain signal $x(t)$ at its frequency component $f_m$. Alternatively, each coefficient $X(f_m)$ may be thought of us indicating the relative amount of energy of $x(t)$ which is contained in the $f_m$ spectral bin thereof, each spectral bin of $x(t)$ being centered at a frequency $f_m$ and having a very narrow bandwidth.

Each digital filter may comprise an interconnection of physical hardware elements, or alternatively, may comprise a combination of hardware and software elements which are structured to compute one of the frequency domain coefficients $X(f_m)$. In either case, the response of each digital filter has the form $\sin(Nx)/\sin(x)$. Consequently, each filter has a main lobe centered at its frequency $f_m$, and has side lobes extending on either side of its main lobe across the frequency range $f_o - f_{N-1}$. The side lobes of the filter corresponding to frequency $f_m$ are most significant at frequencies adjacent to $f_m$ in the range $f_o - f_{N-1}$.

The response curve of a filter having a given center frequency $f_m$ has a null at each of the other frequencies $f_m$ in the range $f_o - f_{N-1}$. Therefore, if a signal $x(t)$ consists only of frequency components $f_m$, the response $X(f_m)$ of a particular filter will accurately represent the signal strength of $x(t)$ at the frequency $f_m$ to which the particular filter corresponds. However, the representation of signal $x(t)$ as a series of discrete frequencies $f_m$ is an approximation based on processing $x(t)$ over a finite time period T. Consequently, signal $x(t)$ is likely to contain a frequency component $f_m' = f_{m+\delta}$, $0 < \delta < 1$, which is within the bandwidth of the main lobe of a particular digital filter. However, a side lobe of other filters may also respond to $f_m'$, and it will thereby appear that the spectral bins of $x(t)$ to which such other filters correspond contain spectral energy which they in fact do not contain. This phenomenon is known as leakage. The occurrence of leakage in digital filters structured according to the Discrete Fourier Transform of a signal $x(t)$ is referenced in the literature, for example, in G. D. Bergland, "A Guided Tour of the Fast Fourier Transform", IEEE Spectrum, July 1969, pp. 41–52.

Leakage may pose a serious problem when the FFT technique is employed in spectral analysis. For example, if a signal $x(t)$, having a very faint component $f_m$, is monitored in a noisy environment, strong noise components contained in the spectral bins of frequencies adjacent to $f_m$ might be sensed by a side lobe of the filter corresponding to $f_m$, and could mask or prevent detection of the faint component. For example, the $f_m$ spectral bin of $x(t)$ could contain a faint signal component, while noise components could be present which had frequencies in the $f_{m-1}$ and $f_{m+1}$ spectral bins, which were not precisely centered at frequencies $f_{m-1}$ and $f_{m+1}$. Consequently, sidelobes of filter $f_m$ would respond to outputs of filters $f_{m-1}$ and $f_{m+1}$, or in other words, energy from the $f_{m-1}$ and $f_{m+1}$ spectral bins would "leak" into the $f_m$ spectral bin of signal $x(t)$ and obscure the faint component thereof.

To reduce the effect of leakage, various windowing techniques have been developed to generate a set of adjusted filter outputs $X'(f_m)$, which are intended to represent the respective outputs of the digital filters if no leakage occurs. According to conventional windowing, the output $X(f_m)$ of each digital filter $f_m$ is considered to comprise an initial estimate or approximation $X(f_m)$. The initial estimates of some or all of the filters are weighted by respective predetermined window weighting values, and the weighted estimates are added, the sum thereof comprising an adjusted estimate or frequency domain coefficient $X'(f_m)$. For example, the initial output $X(f_m)$ of filter $f_m$ may be weighted by a factor of $\frac{1}{2}$, and the outputs of adjacent filters $f_{m+1}$ and $f_{m-1}$, $X(f_{m+1})$ and $X(f_{m-1})$, may be weighted by a factor of $\frac{1}{4}$, whereby $X'(f_m) = \frac{1}{2}X(f_m) + \frac{1}{4}X(f_{m+1}) + \frac{1}{4}X(f_{m-1})$. By employing such windowing technique, the contribution to $X'(f_m)$ from frequency components in the $f_{m+1}$ and $f_{m-1}$ spectral bins is substantially reduced, in relation to the contribution of a frequency component in the $f_m$ spectral bin.

To apply weighting values to the frequency domain coefficients of a signal $x(t)$, the signal may be multiplied in the time domain by a selectively shaped time domain window function. Alternatively, each of the frequency domain coefficients may be convolved with the frequency domain transform of the window function, by means of a convolution circuit.

Conventional windowing techniques have the effect of diminishing the response of the most significant sidelobes of a digital filter $f_m$. However, such techniques also tend to increase the bandwidth of the main lobe of the filter, whereby the resolution of the filter may be substantially reduced. Also, all of the window weights are fixed, that is, they must be precalculated, preassigned and prestored without regard to the actual spectral energy distribution of a signal received by the system. Therefore, such windowing does not discriminate between sidelobes of the various filters which do contribute to leakage and sidelobes which do not. Such windowing is also unresponsive to the presence or extent of leakage in the output of a given digital filter.

SUMMARY OF THE INVENTION

The present invention provides apparatus, or alternatively a method, for the spectral analysis of a received signal. According to the invention, a window employed in Fast Fourier Transform processing to eliminate leakage from respective quantities provided by the processing is iteratively adjusted or adapted, according to the amount of leakage which is present in the quantities.

In apparatus embodying the invention, means for sampling a received time-domain signal at a selected sampling rate is provided. Filter means receive a specified number of samples of the received signal during a specified time period to provide initial estimates of the strength of the signal at selected discrete frequencies in a range of frequencies. A number of adjustable window means are also provided, each of the initial estimates uniquely corresponding to a different one of the adjustable window means. Each of the window means receives its corresponding initial estimate and also receives a selected number of non-corresponding initial estimates, a given one of the window means for selectively weighting each of its received non-corresponding initial estimates to minimize a given window means output, the given window means output comprising the variance or sum of the corresponding initial estimate and the weighted non-corresponding initial estimates of the given window means. Spectral recording means receiving a window means output from each of the window means is provided for recording the strength of the received signal at each of the discrete frequencies in the above range.

Preferably, the given adjustable window means of the apparatus comprises a weighting means for applying variable weighting values to the non-corresponding initial estimates of the given window means to provide a set of weighted signal strength estimates, and means for adding the weighted estimates and the corresponding initial estimate of the given window means to provide the given window means output. A weight adjust means coupled to each of the weighting means receives the given window means output, and comprises means responsive to the given window means output for adjusting the applied weighting values at the conclusion of each of a succession of updating cycles, in order to minimize the given output, each adjustment being based on previous values of the given output. Preferably also, the filter means comprises means for providing a number of initial estimates which is equal to the aforementioned number of samples, each of the initial estimates being equal to one of the frequency domain coefficients of the Discrete Fourier Transform of the received signal which is calculated for the above specified number of samples, and the above specified time period.

In a preferred embodiment, the weight adjust means comprises computer means for iteratively determining the weighting values according to a selected set of equations. The filter means comprises an array of digital filters, each of the filters having a response curve comprising a main lobe of selected bandwidth centered at a given one of the discrete frequencies, and side lobes extending across the above frequency range on either side of the main lobe, each of the filters for providing an output which comprises one of the initial estimates.

Embodied as a method for spectral analysis, the invention comprises the steps of: sampling a received signal at a selected sampling rate; Fast Fourier Transforming a specified number of samples of the received signal during a specified time period to provide a number of initial estimates of the strength of the signal at selected discrete frequencies in a range of frequencies; weighting each of the initial estimates which is included in a set of initial estimates by variable weighting values, at least one of the initial estimates provided by the Fast Fourier Transform being excluded from the set; iteratively adjusting the weighting values to minimize the variance or sum of the weighted initial estimates and an initial estimate excluded from the set, the variance comprising an adjusted signal strength estimate; and recording each adjusted signal strength estimate to provide a record of the frequency components of the received signal.

OBJECTS OF THE INVENTION

An important object of the present invention is to provide an improved apparatus and method for estimating the spectral content of a time domain signal without reducing spectral resolution.

Another object is to provide a system for estimating the spectral content of a time domain signal which employs an array of digital filters structured according to the Fast Fourier Transform, wherein actual spectral data is used to eliminate leakage from the filter outputs.

Another object is to provide a system of the above type wherein sensed spectral data is used to determine the window weighting values which are applied to various filter outputs to reduce or eliminate leakage components from filter outputs.

Another object is to provide a system of the above type wherein window weights are iteratively adjusted to minimize the sum or variance of a selected number of weighted filter outputs, and a selected unweighted filter output.

Another object is to provide a system employing Fast Fourier Transform processing for detecting the presence of a faint frequency component in a signal received in a noisy environment, wherein window weights employed in the Fast Fourier Transform process are iteratively adjusted according to the amount of energy which leaks into a spectral bin containing the faint frequency component from adjacent spectral bins.

These and other objects of the invention will become more readily apparent from the ensuing specification when taken together with the drawings.

DESCRIPTION OF THE PREFERRED EMBODIMENT

Figure 1:
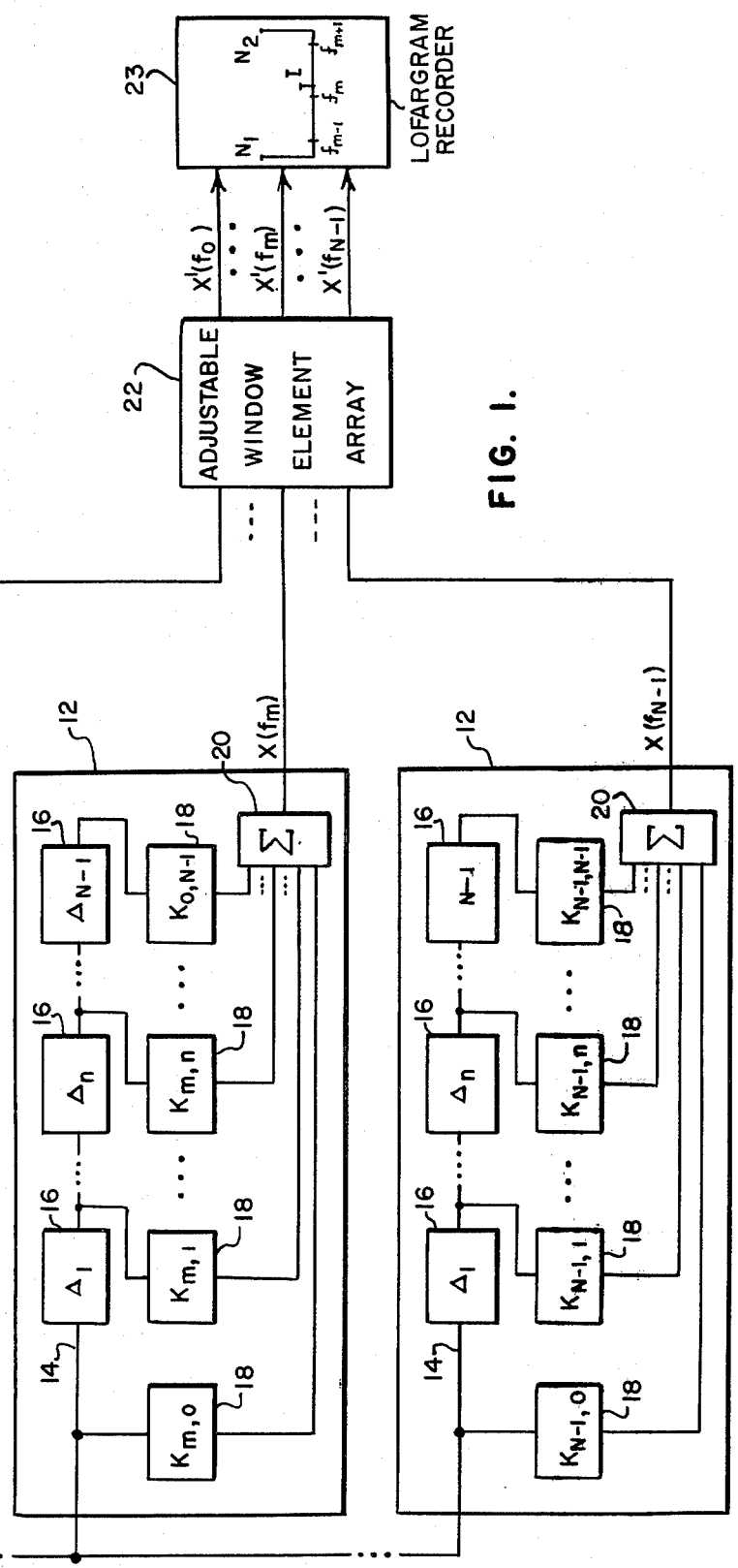
FIG. 1 is a block diagram showing an embodiment of the invention.

Referring to FIG. 1, there is shown a sampling switch 10 which receives a continuous time domain signal $x(t)$ from a very noisy environment, and which samples the instantaneous value of $x(t)$ at intervals of $\Delta T$. $x(t)$ may include an acoustic signal $x_i(t)$ received from an underwater environment, $x_i(t)$ containing a very faint or weak frequency component which conveys useful information. $x(t)$ may further include $x_n(t)$, which comprises strong noise components from the underwater environment which have frequencies that are adjacent to the faint component. $\Delta T$ may usefully be 0.3 milliseconds, whereby $f_s$, the sampling frequency of switch 10, is 3.3 KHz $f_s = 1/\Delta T$.

Successive samples of $x(t)$ are coupled through parallel leads to each of N digital filters 12 of a filter array, where N is a specified number such as 1,024, and where each digital filter 12 corresponds to a different discrete frequency $f_m$ in the frequency range $f_o - f_{N-1}$. m is an integer from 0 to $N-1$, and all of the frequency components of $x(t)$ lie in the range $f_o - f_{N-1}$. Each filter 21 includes a delay line 14, each delay line comprising $N-1$ delay elements 16 connected in series. The delay elements 16 of a given delay line 14 are identified by integers n, from 1 to $N-1$, and each delay element 16 delays a signal passing therethrough by a time $\Delta T$. The total delay T provided by the delay line 14 of each filter 12 is therefore $T = \Delta T(N-1)$.

The output of each delay element 16 of filters 12 is tapped, and coupled to a multiplier 18 for multiplication by a selected constant value. The input to each delay line 14 is also coupled to a multiplier 18, and the outputs of all the multipliers 18 of a filter 12 are coupled to an adder 20. Adder 20 provides the sum of the outputs of all the multipliers of a filter, or the variance thereof if the outputs of the multipliers are complex numbers. The output of the nth delay element 16 of the mth filter 12 is coupled to a multiplier 18 for multiplication by a constant $k_{m,n}$, and the input to the delay line 14 of the mth filter 12 is coupled to a multiplier 18 for multiplication by a constant $K_{m,0}$.

Referring to the aforestated equations for the Discrete Fourier Transform pair, it will be readily apparent that if each multiplier 18 comprises a device for multiplying complex numbers, and if each constant $k_{m,n}$ is selected to be $K_{m,n} = e^{j2\pi mn/N}$, where $m,n = 0, 1, 2, \ldots N-1$, the output of adder 20 of the mth digital filter 12 will be $X(f_m)$. That is, by providing each filter 12 with such multiplier devices, sampling switch 10 and the array of digital filters 12 comprise a Fast Fourier Transform processor for representing received signal $x(t)$ in the frequency domain, in the form of a set of frequency domain coefficients. The output of adder 20 of the mth filter comprises the output of the mth filter.

Each of the filter outputs $X(f_m)$ represents the signal strength of the frequency component $f_m$ of signal $x(t)$, in relation to the signal strengths of the other frequency components thereof. Alternatively, $X(f_m)$ represents the relative amount of power or energy in the spectral bin $f_m$ of signal $x(t)$, a spectral bin comprising all the frequencies in a very narrow bandwidth which is centered at $f_m$. Each $X(f_m)$ of a filter 12 is obtained from the FFT processing of N samples of $x(t)$ over a time period T, where N and T are both specific, finite values. Consequently, each $X(f_m)$ is an approximation or estimate of the signal strength of a frequency component of $x(t)$. While each estimate $X(f_m)$ may be improved by increasing time period T for a given number of samples N, the sampling frequency $f_s$ is thereby reduced. However, from the Sampling Theorem, it is required that $f_s$ be at least twice $f_{N-1}$, the highest frequency component present in signal $x(t)$.

Figure 2:
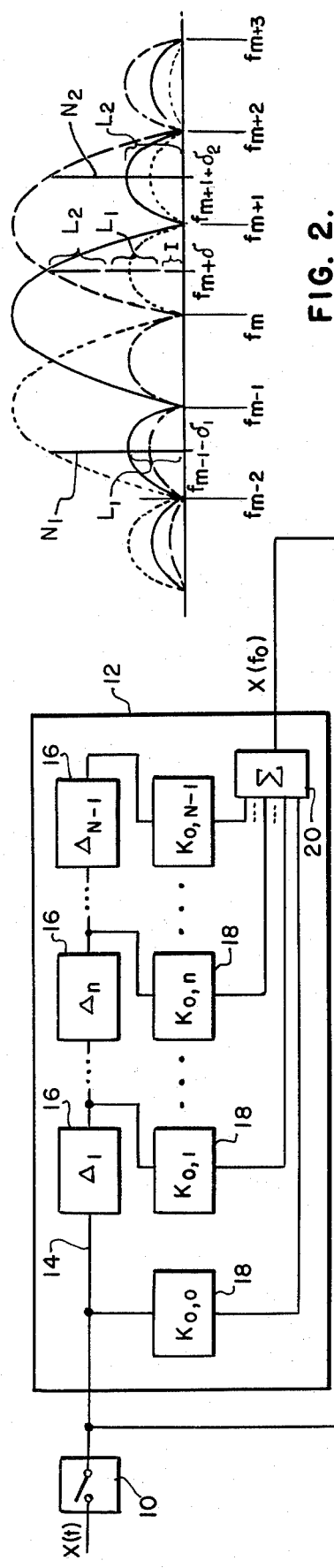
FIG. 2 illustrates the magnitude response curves of adjacent filters of the embodiment of FIG. 1.

Referring to FIG. 2, there are shown the response curves of three adjacent digital filters 12, the filters which respectively provide estimates $X(f_{m-1})$, $X(f_m)$, and $X(f_{m+1})$. The response of each filter is of the form $\sin(Nx)/\sin(x)$, as aforementioned, whereby each filter output has a main lobe centered at its corresponding frequency, and has side lobes extending on either side of its main lobe across the frequency range $f_0 \ldots$. The main lobe of a filter 12 may be thought of as comprising one of the spectral bins of signal $x(t)$, so that the total energy of the frequency components lying within the main lobe comprises the energy included in the spectral bin.

Because of its side lobe response, the bandwidth of a given filter is extended beyond the bandwidth of its main lobe. Consequently, frequency components of other filters which are not located precisely at the central frequencies of such filters will be detected by the side lobes of the given filter, and the spectral bin to which the given filter corresponds will seem to contain energy which is not actually present in a signal processed by the filters. As aforementioned such energy comprises leakage, and may have the effect of obscuring a signal component which is actually present in the signal. It will be noted from FIG. 2 that the most significant side lobes of a given filter are those that are adjacent to its main lobe. Consequently, the filters adjacent to the given filter contribute the most significant leakage thereto.

Referring further to FIG. 2, there is shown a frequency component $X(f_{m+\delta}) = I$, $0 < \delta < 1$, where I is a very faint frequency component of information signal $X_i(t)$. Also, $0 < \delta < 1$ so that I is within the main lobe of filter $f_m$, and is therefore included in the spectral bin $f_m$. Frequency components $X(f_{m-1-\delta_1}) = N_1$ and $X(f_{m+1+\delta_2}) = N_2$ are strong noise components received along with signal $x_i(t)$, and are respectively included in spectral bins $f_{m-1}$ and $f_{m+1}$. The values of $\delta_1$ and $\delta_2$ are selected so that $0 < \delta_1, \delta_2 < 1$, so that neither frequency component $N_1$ nor $N_2$ lies precisely at the center frequency of any filter 12. Therefore, $L_1$, a portion of noise component $N_1$, and $L_2$, a portion of noise component $N_2$, are sensed by side lobes of filter $f_m$, and the output of filter $f_m$ is $X(f_m) = I + L_1 + L_2$. The output of filter $f_m$ thereby includes a substantial leakage component $L_1 + L_2$, resulting from noise, which is very likely to prevent detection or recognition of frequency component I in signal $x_i(t)$.

Referring once more to FIG. 1, there is shown each of the signal strength estimates $X(f_m)$ provided by filters 12 coupled to an array 22 of adjustable window elements. Each of the adjustable window elements, which are described hereinafter in greater detail, corresponds to one of the filters 12, and senses the presence of a leakage component in the output thereof. Further, each window element responds to leakage in a received output $X(f_m)$, which is hereinafter referred to as an initial estimate, by providing an adjusted signal strength estimate $X'(f_m)$. Each adjusted estimate $X'(f_m)$ is equal to initial estimate $X(f_m)$, less the leakage which is present in spectral bin $f_m$ from other spectral bins adjacent thereto. Each of the adjusted signal strength estimates $X'(f_m)$ thereby represent the energy or power which is actually present in respective spectral bins $f_m$, and is coupled to a device 23, such as a lofargram recorder, to record or display the spectral components of signal $x(t)$. Recorder 23 comprises a device for recording or displaying values of $X'(f_m)$ at any given time, whereby it provides the instantaneous power of the frequency components of $x(t)$. Alternatively, it comprises a device for averaging instantaneous values of $X(f_m)$ over a period of time to show average power of $x(t)$.

Figure 3:
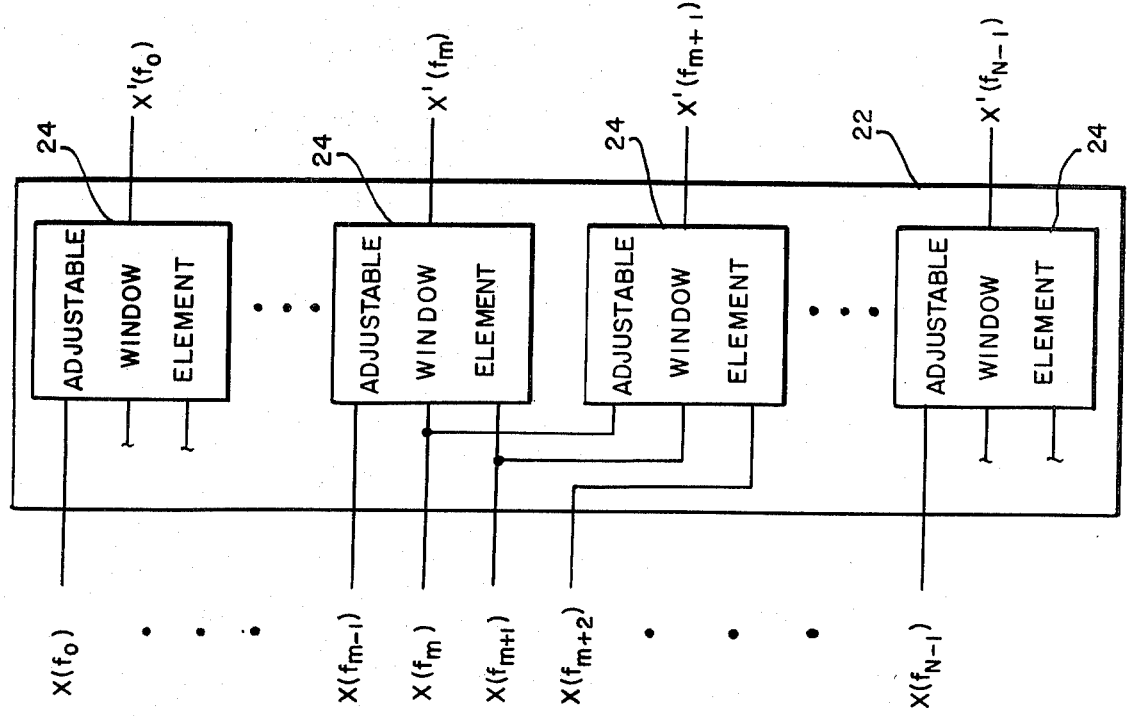
FIG. 3 is a block diagram showing an array of adjustable window elements for the embodiment of FIG. 1.

Referring to FIG. 3, there is shown adjustable window element array 22 receiving each of the initial signal strength estimates $X(f_0)-X(f_{N-1})$. Each of the digital filters 12, and the initial estimates provided thereby, corresponds to a different one of the adjustable window elements 24 in array 22, and is respectively coupled thereto. In addition, the initial estimates of a selected number of filters which are adjacent to a given filter 12 are also coupled to the adjustable window element 24 to which the given filter corresponds. The adjustable window element of the given filter applies a window weight, or weighting value, to each received non-corresponding initial estimate, and provides an output $X'(f_m)$. As aforementioned, $X'(f_m)$ represents the actual power or energy contained in the spectral bin $f_m$ of signal $x(t)$, leakage energy from other spectral bins being removed therefrom. Consequently, if an adjustable window element 24 provides a non-zero output $X'_m$, corresponding to the $f_m$ spectral bin of $x(t)$, one using the apparatus of the invention may be confident that $x(t)$ in fact has a frequency component $f_m$.

It will be noted that FIG. 3 shows each adjustable window element 24 receiving two non-corresponding initial estimates, comprising the outputs of the two filters 12 which are adjacent to the filter corresponding to the window element. While a window may receive more non-corresponding outputs, the outputs of the adjacent filter outputs provide the most significant amount of leakage. Generally, the amount of leakage a first filter output receives from a second filter is a function of the proximity of the first filter with respect to the second filter.

Figure 4:
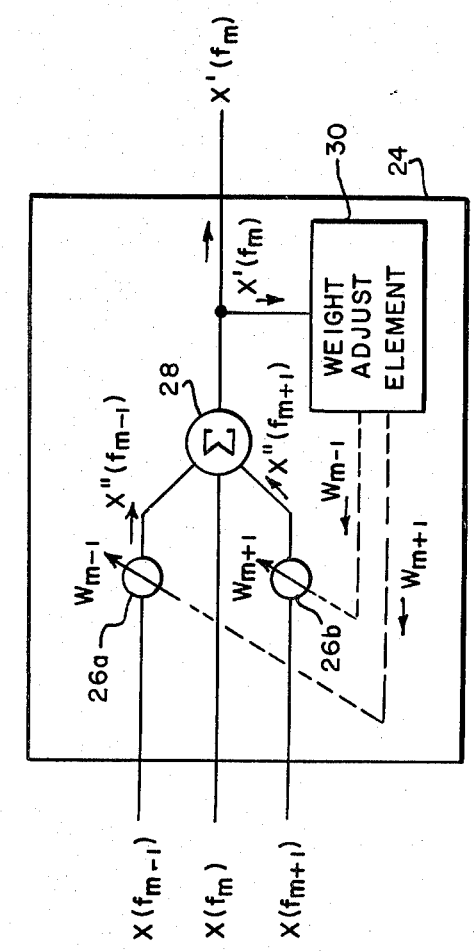
FIG. 4 is a block diagram showing an adjustable window element for the embodiment of FIG. 1.

Referring to FIG. 4, there is shown the adjustable window element 24 to which the digital filter 12 which provides initial estimate $X(f_m)$ corresponds. In addition to receiving corresponding initial estimate $X(f_m)$, the adjustable window element of FIG. 4 also receives non-corresponding initial estimates $X(f_{m-1})$ and $X(f_{m+1})$. Initial estimates $X(f_{m-1})$ and $X(f_{m+1})$ are respectively coupled to weighting elements 26a and 26b, each of which comprises means for applying a weighting value to one of the non-corresponding initial estimates. Weighting element 26a applies a variable weighting value $W_{m-1}$ to initial estimate $X(f_{m-1})$, to provide a weighted signal strength estimate $X''(f_{m-1})$, and a variable weighting value $W_{m+1}$ is likewise applied to initial estimate $X(f_{m+1})$ to provide a weighted signal strength estimate $X\Delta(f_{m+1})$. Weighted estimates $X''(f_{m-1})$ and $X''(f_{m+1})$ and initial estimate $X(f_m)$ are coupled to adder 28 to provide adjusted estimate $X'(f_m)$, $X'(f_m)$ thereby comprising the sum of $X''(f_{m-1})$, $X''(f_{m+1})$ and $X(f_m)$, or the variance thereof if they are complex numbers.

Elements 26a and 26b may each comprise a convolution circuit, whereby $X''(f_{m-1})=X(f_{m-1})*W_{m-1}$, the convolution of $X(f_{m-1})$ and a weighting value $W_{m-1}$, and $X''(f_{m+1})=X(f_{m+1})*W_{m+1}$, the convolution of $X(f_{m+1})$ and a weighting value $W_{m+1}$. Convolution circuits are well known in the art and are disclosed, for example, in U.S. Pat. No. 3,808,412, issued Apr. 30, 1974, to Richard Allen Smith for an "FFT Filter Bank for Simultaneous Separation and Demodulation of Multiplexed Signals", filed Dec. 27, 1971. FIG. 1C of the drawings of Smith shows a convolution circuit, element 213, which is employed to convolve, or apply, values of a frequency domain window W to the frequency coefficients provided by the Fast Fourier Transform of a time domain signal. According to Smith, column 10, lines 31-34, all of the frequency window function values are read from a memory 211, and therefore appear to be predetermined and prestored, without having any relation to the amount of leakage which is present in the respective outputs of the filters 12.

In contrast to the Smith patent, the adjustable window element 24 provides a weight adjust element 30 for coupling values $W_{m-1}$ and $W_{m+1}$ to weighting elements 26a and 26b. As aforementioned, initial estimate $X(f_m)$ includes a component which represents the signal strength I of frequency component $f_m$ of signal $X_i(t)$, and also includes leakage from the outputs of adjacent filters $f_{m-1}$ and $f_{m+1}$. Weight adjust element 30 therefore comprises a device which receives $X'(f_m)$, and responds thereto by iteratively varying weighting value $W_{m-1}$ and $W_{m+1}$ until the values thereof are such that the variance of $X(f_{m-1})*W_{m-1}$ and $X(f_{m+1})*W_{m+1}$ cancels out the leakage component in $X(f_m)$ which is provided by filter outputs $X(f_{m-1})$ and $X(f_{m+1})$. $W_{m-1}$ and $W_{m+1}$ are at their optimum values when the relation $X'(f_m)=X(f_m)+X''(f_{m-1})+X''(f_{m+1})$ is at a minimum, that is, when all the leakage energy has been removed from the spectral bin $f_m$.

Weight adjust element 30 comprises one of a number of devices for adjusting values of $W_{m-1}$ and $W_{m+1}$ at the conclusion of each of a succession of updating cycles of time period $T_{up}$, each calculation being based on previous values of $W_{m-1}$ and $W_{m+1}$. Element 30 very usefully comprises a digital computer which is structured to optimize $W_{m-1}$ and $W_{m+1}$, that is, to find the values of $W_{m-1}$ and $W_{m+1}$ which minimize the relationship $$X'(f_m)=X(f_m)+X(f_{m-1})*W_{m-1}+X(f_{m+1})*W_{m+1},$$

by solving the following set of equations during each updating cycle:

$$W_{m-1}(\tau+1)=W_{m-1}(\tau)-\alpha g_{m-1}(\tau) \quad \text{Eqn. 3}$$

and $$W_{m+1}(\tau+1)=W_{m+1}(\tau)=\alpha g_{m+1}(\tau) \quad \text{Eqn. 4}$$

where $\tau+1$ is the $\tau+1$th updating cycle, $0<\alpha<1$ for optimum stability, and $g_{m-1}(\tau)$ and $g_{m+1}(\tau)$ are gradients derived from values of $X(f_m)$, $X(f_{m-1})$, $X(f_{m+1})$, $W_{m-1}$ and $W_{m+1}$ calculated during the $\tau$th cycle according to the relations.

$$g_{m-1}(\tau) = -X(f_m)^*(\tau) X(f_{m-1})$$
$$(\tau) + [X(f_{m-1})(\tau)X(f_{m-1})^*(\tau)$$
$$W_{m-1}(\tau)] + [X(f_{m-1})(\tau)X(f_{m+1})^*(\tau) W_{m+1}(\tau)]$$
$$+ \mu[U_{m-1} U^*_{m-1} W_{m-1}(\tau) + U_{m-1}U^*_{m+1}$$
$$W_{m+1}(\tau) + V_{m-1} V^*_{m-1} W_{m-1}(\tau) + V_{m-1}$$
$$V^*_{m+1} W_{m+1}(\tau)]$$
Eqn. 5

$$g_{m+1}(\tau) = -X(f_m)^*(\tau)$$
$$X(f_{m+1})(\tau) + [X(f_{m+1})(\tau)X(f_{m+1})^*(\tau)$$
$$W_{m+1}(\tau)] + [X(f_{m+1})(\tau)X(f_{m-1})^*(\tau)$$
$$W_{m-1}(\tau)] + \mu[U_{m+1} U^*_{m+1} W_{m+1}(\tau) + U_{m+1}$$
$$U^*_{m-1} W_{m-1}(\tau) + V_{m-1} V^*_{m+1} W_{m+1}$$
$$(\tau) + V_{m+1} V^*_{m-1} W_{m-1}(\tau)]$$
Eqn. 6 where $\mu$ is the Langrangian multiplier, and where * represents the complex conjugate of a quantity.

The U and V terms in the above equations comprise quadratic constraint vectors, $\underline{V} = [V_{m+1}, V_{m-1}]$ and $\underline{V} = [V_{m+1}, V_{m-1}]$. The constraint vectors are required to prevent the above calculation of $X'(f_m)$ from being less than the actual signal strength of a frequency component in the $f_m$ spectral bin of signal $x(t)$ when the frequency component is in fact $f'_m = f_m + \delta, 0 < \delta < 1$. For such condition, adjacent filter outputs $X(f_{m-1})$ and $X(f_{m+1})$ will include leakage components from spectral bin $f_m$. Without the inclusion of the constraining terms in the above equations, such leakage would be scaled up and subtracted from $X'(f_m)$ during the process of minimizing the above relation for $X'(f_m)$.

Constraint vectors $\underline{U}$ and $\underline{V}$ are determined according to the following relationships:

$$[\underline{W}^H\underline{U}]^2 = 0 = W^*_{m+1} U_{m+1} U^*_{m+1}$$
$$W_{m+1} + W^*_{m+1} U_{m+1} U^*_{m-1} W_{m-1} + W^*_{m-1}$$
$$U_{m-1} U^*_{m+1} W_{m+1} + W^*_{m-1} U_{m-1} U^*_{m-1}$$
$$W_{m-1}$$
Eqn. 7

$$[\underline{W}^H\underline{V}]^2 = 0 = W^*_{m-1} V_{m+1} V^*_{m+1}$$
$$W_{m+1} + W^*_{m+1} V_{m-1} V^*_{m-1} W_{m-1} + W^*_{m-1}$$
$$V_{m-1} V^*_{m+1} W_{m+1} + W^*_{m-1} V_{m-1} V^*_{m-1}$$
$$W_{m-1}$$
Eqn. 8 where $\underline{W}^H$ is the vector $[W_{m+1}, W_{m-1}]$.

The above set of equations are shown for the special case of each adjustable window element 24 receiving only two non-corresponding initial estimates. However, they also readily apply to the general case, where an element 24 receives initial estimates from filters besides the filters which are immediately adjacent to its corresponding filter. In addition, while the above set of equations has been found to be very useful in adapting weighting values to minimize the value of $X'(f_m)$, it is anticipated that other relationships known in the art may alternatively be employed, and it is therefore not intended to limit the scope of the invention to the above equations.

Figure 5:
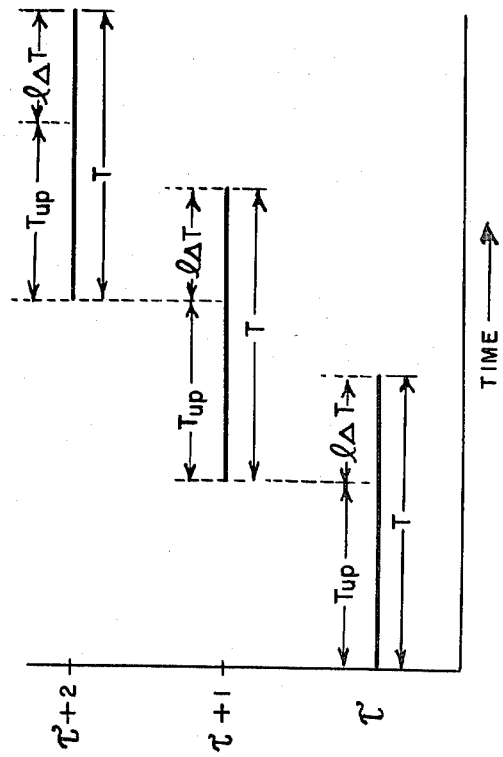
FIG. 5 is a graph showing the relationship between the time period of a block of data sampled by the embodiment of FIG. 1 and the time period of an updating cycle of an adjustable window element.

Referring to FIG. 5, there is shown the relationship between $T_{up}$, the time period of the updating cycles, and T, the time period during which a block of data, comprising N samples of signal $x(t)$, is acquired and processed. FIG. 5 shows $T_{up}$ to be less than T by an amount $l\Delta T$, where $l$ is an integer less than $N-1$ and $\Delta T$ is the sampling interval. The updating cycles therefore overlap the processing time periods. As $\tau$, the number of updating cycles, is increased, $W_{m-1}$ and $W_{m+1}$ converge to their optimum values, according to the above equations. The weight adjust element 30 for each adjustable window element 24 is provided with a memory for retaining the quantities generated during a given updating cycle which are needed for calculations during the next following cycle.

In a modification of the above embodiment, which is very useful for low signal to noise ratios, weighting values $W_{m-1}$ and $W_{m+1}$ are determined from the average values of $X(f_m)$, $X(f_{m-1})$ and $X(f_{m+1})$ taken over several previous updating cycles, rather than from the instantaneous values thereof for the just previous cycle. To implement such modification, weight adjust element 30 may be structured according to the following set of equations, which are shown for two averages:

$$W_{m-1}(\tau+2) = W_{m-1}(\tau) - \alpha g_{m-1}(\tau)$$
Eqn. 9

$$W_{m+1}(\tau+2) = W_{m+1}(\tau) - \alpha g_{m+1}(\tau)$$
Eqn. 10

$$g_{m-1}(\tau) = -\tfrac{1}{2}[X(f_m)^*(\tau)X(f_{m-1})(\tau) + X(f_m)^*(\tau+1)\cdot$$
$$X(f_{m-1})(\tau+1)] + \tfrac{1}{2}[X(f_{m-1})(\tau)X(f_{m-1})^*(\tau) + X(-$$
$$f_{m-1})(\tau+1)X(f_{m-1})^*(\tau+2)]W_{m-1}(\tau) + \tfrac{1}{2}[X(f_m-$$
$$-1)(\tau)X(f_{m+1})^*(\tau) + X(f_{m-1})(\tau+1)X(f_{m+1})^*(\tau-$$
$$+1)]W_{m+1}(\tau) + \mu[U_{m-1} U^*_{m-1}$$
$$W_{m-1}(\tau) + U_{m-1} U^*_{m+1} W_{m+1}(\tau) + V_{m-1}$$
$$V^*_{m-1} W_{m-1}(\tau) + V_{m-1} V^*_{m+1} W_{m+1}(\tau)]$$
Eqn. 11

$$g_{m+1}(\tau) = -\tfrac{1}{2}[X(f_m)^*(\tau)X(f_{m+1})(\tau) + X(f_m)^*(\tau+1)\cdot$$
$$X(f_{m+1})] + \tfrac{1}{2}[X(f_{m+1})(\tau)X(f_{m+1})^*(\tau) + X(f_{m+1})(-$$
$$\tau+1)X(f_{m+1})^*(\tau+1)]W_{m+1}(\tau) + \tfrac{1}{2}[X(f_{m+2})(\tau)X-$$
$$(f_{m-1})^*(\tau) + X(f_{m+1})(\tau+1)X(f_{m-1})(\tau+1)]W_m-$$
$$-1(\tau) + \mu[U_{m+1} U^*_{m+1} W_{m+1}(\tau) + U_{m+1}$$
$$U^*_{m-1} W_{m-1}(\tau) + V_{m-1} V^*_{m+1} W_{m+1}$$
$$(\tau) + V_{m+1} V^*_{m-1} W_{m-1}(\tau)]$$
Eqn. 12

Obviously, many other modifications and variations of the present invention are possible in the light of the above teachings, and, it is therefore understood that within the scope of the disclosed inventive concept, the invention may be practiced otherwise than as specifically described.

What is claimed is:

1. Spectral analysis apparatus comprising:
   a Fast Fourier Transform processor receiving a time domain signal for providing the frequency domain coefficients of the Fast Fourier Transform of said time domain signal which is generated when said processor is operated to sample said time domain signal at a specified number of intervals over a time period of specified duration, each of said coefficients comprising an initial estimate;
   a selected number of adjustable window means, a given one of said adjustable window means receiving a selected number of said initial estimates for sensing the presence of a leakage component in a given one of said received initial estimates, and for providing an adjusted signal strength estimate, said adjusted signal strength estimate comprising the difference between said given received initial estimate and said sensed leakage component; and
   means for monitoring the adjusted signal strength estimate of said given adjustable window means, and also for monitoring other adjusted signal strength estimates provided by the remaining adjustable window means.

2. The apparatus of claim 1 wherein:
   each of said adjustable window means receives a first initial estimate and a selected number of second initial estimates, a given one of said adjustable window means comprising means for weighting each of the second initial estimates received by said given adjustable window means by a variable weighting value to minimize the variance of the first initial estimate and weighted second initial estimates received by said given adjustable window means.

3. The apparatus of claim 2 wherein:
each of said adjustable window means comprises means for iteratively varying each of said weighting values to minimize said variance.

4. Spectral analysis apparatus comprising:
means for sampling a signal received by said apparatus at a selected sampling rate;
filter means receiving a specified number of samples of said received signals during a specified time period for providing initial estimates of the strength of said signal at selected discrete frequencies in a range of frequencies;
a number of adjustable window means, each of said initial estimates uniquely corresponding to a different one of said adjustable window means, each of said window means receiving its corresponding initial estimate and also receiving a selected number of non-corresponding initial estimates, a given one of said window means for selectively weighting each of its received non-corresponding initial estimates to minimize a given window means output, said given window means output comprising the sum of the corresponding initial estimate and the weighted non-corresponding initial estimates of said given window means; and
spectral recording means receiving a window means output from each of said window means for recording the strength of said received signal at each of said discrete frequencies.

5. The apparatus of claim 4 wherein said given adjustable window means comprises:
weighting means for applying variable weighting values to said non-corresponding initial estimates of said given window means to provide a set of weighted signal strength estimates;
means for adding said weighted estimates and the corresponding initial estimate of said given window means to provide said given window means output; and
weight adjust means receiving said given window means output and coupled to each of said weighting means for adjusting said weighting values to minimize said given window means output.

6. The apparatus of claim 5 wherein:
said filter means comprises means for providing a number of initial estimates equal to said specified number of samples, each of said initial estimates being equal to one of the frequency domain coefficients of the Discrete Fourier Transform of said received signal for said specified number of samples of said received signal and for a time period equal to said specified time period; and
said weight adjust means of said given window means comprises means responsive to said given window means output for iteratively adjusting said weighting values to minimize said given output at the conclusion of each of a succession of updating cycles, a given one of said adjustments being made according to previous values of said given output.

7. The apparatus of claim 6 wherein:
said weight adjust means comprises digital computer means for iteratively adjusting said weighting values according to a selected set of equations.

8. The apparatus of claim 4 wherein:
said filter means comprises an array of digital filters, each of said filters having a response curve comprising a main lobe of selected bandwidth centered at a given one of said discrete frequencies, and side lobes extending across said frequency range on either side of said main lobe, each of said filters for providing an output which comprises one of said initial estimates.

9. The apparatus of claim 8 wherein said received signal has a first frequency component included in the bandwidth of the main lobe of a given one of said filters, and also has one or more second frequency components included in a side lobe of said given filter, said second frequency components being unequal to any of said discrete frequencies in said frequency range, and wherein:
said given filter comprises means for providing a given initial estimate, said given initial estimate having a first component which represents the signal strength of said first frequency component, and also having a second component which represents the sum of the signal strengths of said second frequency components; and
said given window means comprises means receiving said given initial estimate for providing a window means output which is equal to said first component.

10. A method for spectral analysis comprising the steps of:
sampling a received signal at a selected sampling rate;
carrying out a Fast Fourier Transformation upon a specified number of samples of said received signal during a specified time period to provide a number of initial estimates of the strength of said received signal at selected discrete frequencies in a range of frequencies;
weighting each of the initial estimates which is included in a set of selected initial estimates by variable weighting values, at least one of the initial estimates provided by the Fast Fourier Transform being excluded from said set;
adjusting said weighting values to minimize the variance of said weighted initial estimates and said excluded initial estimate, said variance comprising one of the adjusted signal strength estimates in a set of adjusted signal strength estimates;
repetitively performing said weighting and adjusting steps to determine each of the remaining adjusted signal strength estimates in said adjusted estimate set;
and recording each of said adjusted signal strength estimates in said adjusted estimate set.

11. The method of claim 10 wherein:
said weighting step comprises the step of weighting the outputs of each of the digital filters included in a set of digital filters, said excluded initial estimate comprising the output of a digital filter which is excluded from said set of digital filters.

12. The method of claim 10 wherein said initial estimates in said set and said excluded estimate each corresponds to a different one of the spectral bins of said received signal, and wherein:
said step of adjusting said weighting values comprises the step of adjusting said weighting values to minimize the amount of signal energy which leaks into the spectral bin to which said excluded initial estimate corresponds from other spectral bins of said received signal.

13. The method of claim 12 wherein:
said step of adjusting said weighting values comprises the step of adjusting said weighting values at the conclusion of each of a succession of updating cycles, each of said adjustments being made according to previous adjustments of said weighting values.

14. The method of claim 13 wherein:
said step of adjusting said weighting values includes the step of adjusting said weighting values according to the average values of the initial estimates of said set taken over a selected number of previous updating cycles.

15. The method of claim 13 wherein:
said step of adjusting said weighting values includes the step of constraining said weighting values to compensate for signal energy which leaks into spectral bins to which initial estimates in said set correspond from the spectral bin to which said excluded initial estimate corresponds.

16. The method of claim 10 wherein:
said step of recording said adjusted signal strength estimates includes the step of averaging the instantaneous values of each of said adjusted signal strength estimates over a selected time period to provide a record of the average power of each of said frequency components of said received signal.

* * * * *